(No Model.) 3 Sheets—Sheet 1.

W. A. RUSSELL.
CAR OMNIBUS.

No. 434,527. Patented Aug. 19, 1890.

Witnesses:
Robert A. Millar
John L. Jackson

Inventor:
William A. Russell
by Bond, Adams & Jones
Attys.

THE NORRIS PETERS CO., PHOTO-LITHO., WASHINGTON, D. C.

(No Model.) 3 Sheets—Sheet 2.

W. A. RUSSELL.
CAR OMNIBUS.

No. 434,527. Patented Aug. 19, 1890.

Witnesses:
Robert A. Miller
John L. Jackson

Inventor:
William A. Russell
by Bond Adams & Jones
att'ys

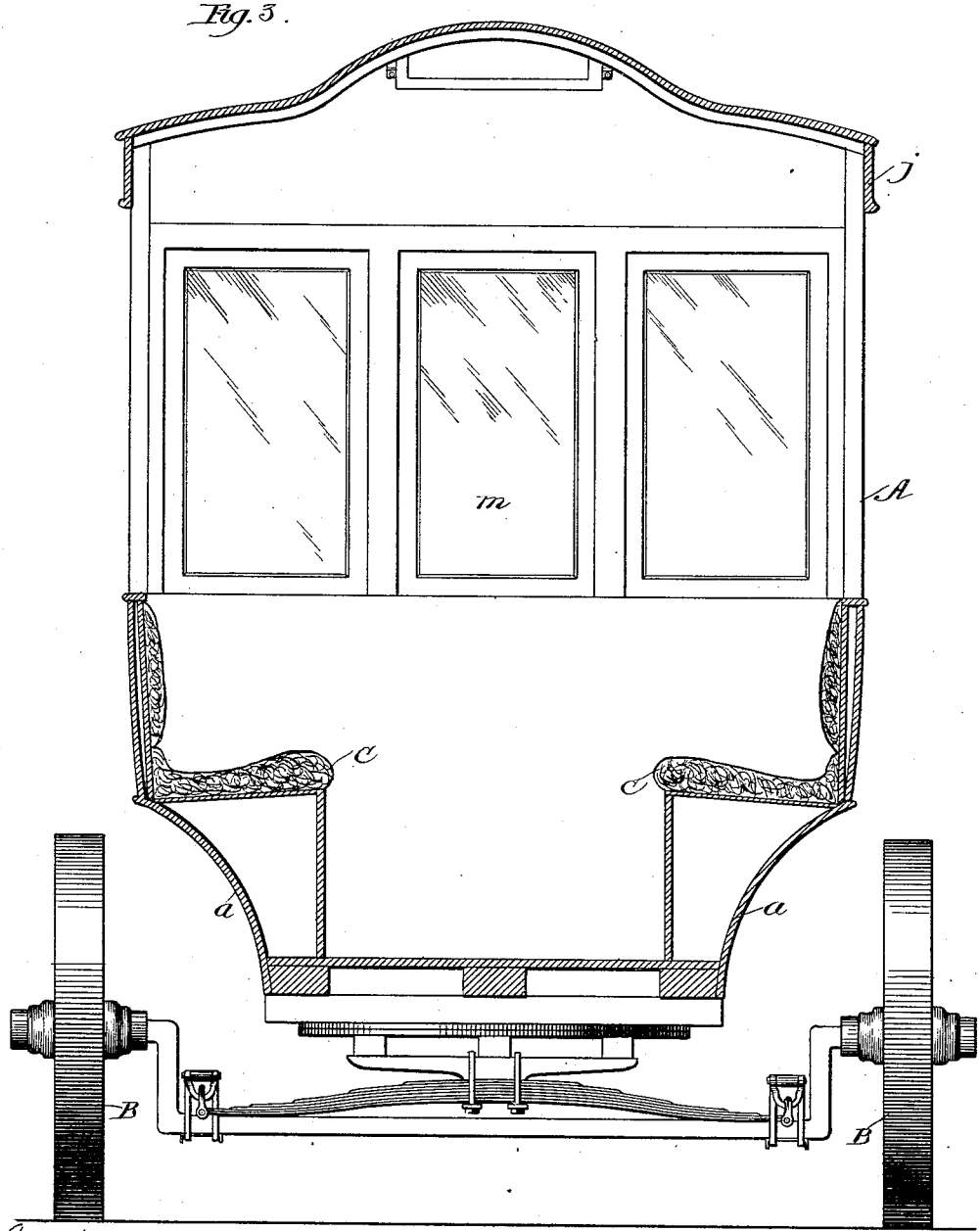

UNITED STATES PATENT OFFICE.

WILLIAM A. RUSSELL, OF CHICAGO, ILLINOIS, ASSIGNOR TO THE RUSSELL STREET CARETTE COMPANY, OF SAME PLACE.

CAR-OMNIBUS.

SPECIFICATION forming part of Letters Patent No. 434,527, dated August 19, 1890.

Application filed May 9, 1890. Serial No. 351,196. (No model.)

*To all whom it may concern:*

Be it known that I, WILLIAM A. RUSSELL, residing at Chicago, in the county of Cook and State of Illinois, and a citizen of the United States, have invented a new and useful Improvement in Car-Omnibuses, of which the following is a specification, reference being had to the accompanying drawings, in which—

Figure 1:
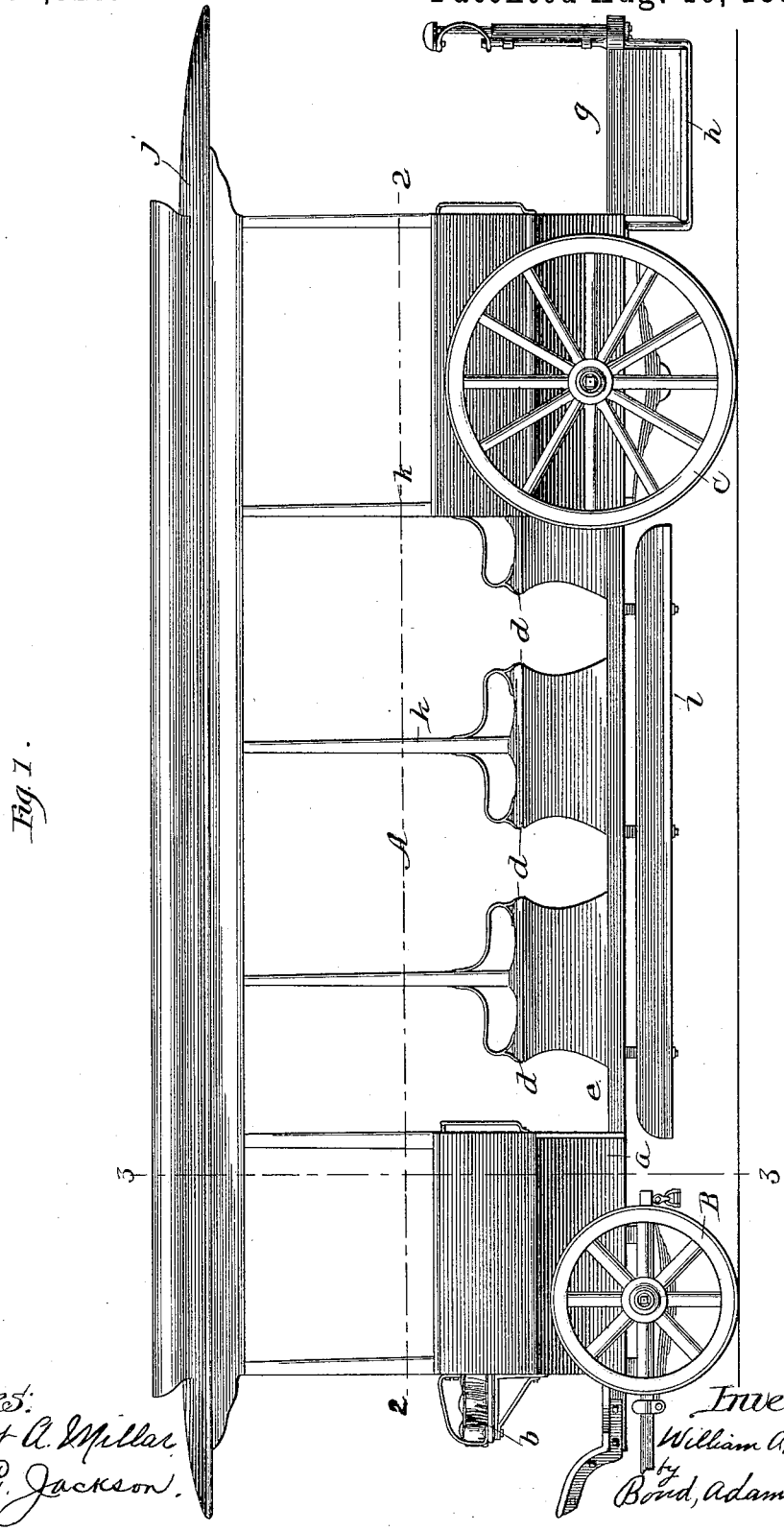
Figure 2:
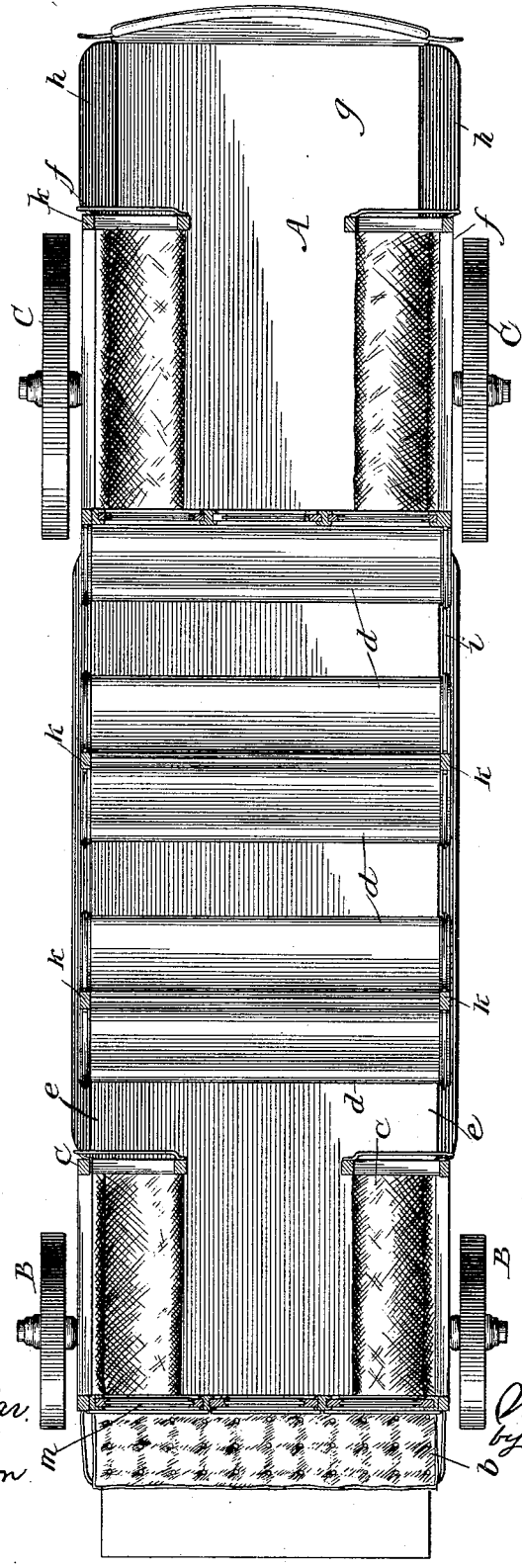

Figure 1 is a side elevation. Fig. 2 is a horizontal section at line 2 2 of Fig. 1, and Fig. 3 is a cross vertical section at line 3 3 of Fig. 1.

This invention relates to car omnibuses or vehicles designed to carry passengers, but not running on a track, and is particularly designed to be used in connection with a running-gear like that shown in my application No. 328,866, filed October 31, 1889.

The object of this invention is to provide an improved body for vehicles of the class above mentioned, which will seat a large number of passengers, and which will permit the passengers to enter at the sides, which I accomplish as illustrated in the drawings and as hereinafter described.

That which I claim as new will be pointed out in the claims.

In the drawings, A represents the body of the car-omnibus, which I will more particularly hereinafter describe.

B B are the forward carrying-wheels, which, as shown, are quite low.

C C are the rear carrying-wheels.

The axles of the wheels B C are bent downwardly, and the springs are made quite flat, so as not to raise the body A any more than necessary for the wheels B to turn under it.

The construction of the running-gear part of this car-omnibus is the same as that patented to me in my former application. The lower panel $a$ on each side of the forward end of the car-body A, as shown in Figs. 1 and 2, is curved inward to permit the wheels B to turn. In the front of the car-body A is a driver-seat $b$. Between the wheels B B, over the panels $a$, are two longitudinal seats $c$ $c$—one on each side. These seats extend rearwardly a sufficient distance to permit the wheels B to turn under the panels $a$, over which these seats $c$ are located.

$d$ represents a number of cross-seats, which are arranged in pairs, the backs of each pair being joined, as clearly shown in Figs. 1 and 2. The number of these cross-seats $d$ will depend upon the length of the car-omnibus. The frame of the car is widened in rear of the panels $a$, so that the seats $d$ extend the entire width of the car-omnibus between the front and rear wheels. The front cross-seat $d$ faces forward, thereby giving entrance-spaces $e$ $e$ at the sides to the seats $c$. The rear cross-seat $d$ faces forward, as best shown in Fig. 2, its back being near the forward edge of the carrying-wheels C.

$f$ $f$ are two longitudinal seats in rear of the cross-seats $d$ and between the rear carrying-wheels C. These seats are located on opposite sides of the car-omnibus and may face each other, as shown.

$g$ is a rear platform to give entrance to the seats $f$. This platform is provided with side steps $h$.

Each side of the car-body A is provided with a step $i$ between the wheels B C to give access to the cross-seats $d$ and longitudinal seats $c$.

This construction of the car-body and arrangement of the seats therein utilizes the entire space between the front wheels and between the rear wheels by longitudinal seats.

The cross-seats $d$ can be made quite long, so as to seat a large number of passengers, and thereby utilize the space between the forward and rear wheels. The seats are all readily accessible and their arrangement enables the largest possible number of passengers to be carried in a car-omnibus of a given length.

The seats may be covered by a roof $j$, and the sides of the car are left open, the roof being supported upon posts $k$. This renders the car an agreeable conveyance and an exceedingly pleasant one for summer use. If desired, the front of the car between the driver's seat $b$ and the longitudinal seats $c$ may be closed by a panel $m$ with windows.

What I claim as new, and desire to secure by Letters Patent, is as follows:

1. A car-omnibus body having longitudinal seat $c$, cross-seats $d$, and longitudinal seats $f$, substantially as specified.

2. The combination, with low forward wheels B and rear wheels C, of a car-body having curved panels $a$ at its forward end and longitudinal seats over said panels $a$, cross-seats $d$ between the forward and rear wheels, and longitudinal seats $f$ between the rear wheels, substantially as specified.

3. The combination, with low forward wheels B and rear wheels C, of the car-body having longitudinal seats at its front and rear ends, and long cross-seats $d$, extending laterally the entire width of the body between the wheels.

4. The combination, with low forward carrying-wheels B and rear wheels C, of a car-body having panels $a$, longitudinal seats $c$ over the panels $a$, cross-seats $d$, entrance-spaces $e\ e$ at the sides of the car in front of the forward cross-seats $d$, and longitudinal seats $f$ between the rear wheels and platform $g$ in rear of the body A, substantially as specified.

WILLIAM A. RUSSELL.

Witnesses:
HARRY T. JONES,
A. H. ADAMS.